(12) United States Patent
Pinardi et al.

(10) Patent No.: US 10,442,129 B2
(45) Date of Patent: Oct. 15, 2019

(54) BLOW MOLDING MACHINE WITH MOLDS MOVED MECHANICALLY AND WITHOUT THE AID OF ELECTRICAL, HYDRAULIC OR PNEUMATIC DEVICES

(71) Applicant: Graham Packaging Company, L.P., Lancaster, PA (US)

(72) Inventors: Gabriele Pinardi, Budrio (IT); Moreno Minghetti, Monaco (MC)

(73) Assignee: Simoparma Packing Italia, S.r.l., Castelguelfo Di Bologna (BO) (IT)

( * ) Notice: Subject to any disclaimer, the term of this patent is extended or adjusted under 35 U.S.C. 154(b) by 336 days.

(21) Appl. No.: 15/523,455

(22) PCT Filed: Oct. 27, 2015

(86) PCT No.: PCT/US2015/057543
§ 371 (c)(1),
(2) Date: May 1, 2017

(87) PCT Pub. No.: WO2016/073242
PCT Pub. Date: May 12, 2016

(65) Prior Publication Data
US 2017/0305060 A1  Oct. 26, 2017

(30) Foreign Application Priority Data

Nov. 4, 2014  (IT) .............................. GE2014A0112

(51) Int. Cl.
*B29C 49/42* (2006.01)
*B29C 49/48* (2006.01)
(Continued)

(52) U.S. Cl.
CPC .............. *B29C 49/56* (2013.01); *B29C 49/04* (2013.01); *B29C 49/4236* (2013.01);
(Continued)

(58) Field of Classification Search
CPC ............ B29C 49/4236; B29C 49/4802; B29C 2049/4805; B29C 2049/4869;
(Continued)

(56) References Cited

U.S. PATENT DOCUMENTS 3,004,285 A * 10/1961 Hagen .................... B29C 49/50
264/527
3,294,885 A * 12/1966 Cines ...................... B29C 49/04
264/527
(Continued)

FOREIGN PATENT DOCUMENTS

CH         703721        3/2012
DE      102009052278    5/2001
(Continued)

OTHER PUBLICATIONS

International Search Report from International Application No. PCT/US2015/057543 issued by the European Patent Office dated Jan. 15, 2016.

*Primary Examiner* — Robert B Davis
(74) *Attorney, Agent, or Firm* — Stradley Ronon Stevens & Young, LLP (57) ABSTRACT

An extrusion blow mold machine forming hollow containers. The machine has at least one pair of opposing half molds that combine to form a mold and define a mold cavity. Each of the half molds is positioned on a carrier plate and includes first, second, and third mold segments. The first and third mold segments can move with respect to each other and with respect to the second, fixed mold segment. A mechanical structure creates vertical movement of the first and third mold segments relative to the second mold segment as the mold opens horizontally, without the aid of any electrical, hydraulic, or pneumatic device. A closing unit engages the carrier plate to move the carrier plate and its respective half (Continued)

mold toward and away from the opposing half mold and its respective carrier plate, thereby closing and opening the mold.

20 Claims, 8 Drawing Sheets

(51) Int. Cl.

| | |
|---|---|
| *B29C 49/54* | (2006.01) |
| *B29C 49/56* | (2006.01) |
| *B29C 49/04* | (2006.01) |
| *B29C 49/60* | (2006.01) |
| *B29L 31/00* | (2006.01) |

(52) U.S. Cl.
CPC .......... *B29C 49/4802* (2013.01); *B29C 49/54* (2013.01); *B29C 49/541* (2013.01); *B29C 49/60* (2013.01); *B29C 2049/481* (2013.01); *B29C 2049/4805* (2013.01); *B29C 2049/4869* (2013.01); *B29C 2049/4882* (2013.01); *B29C 2049/4892* (2013.01); *B29C 2049/542* (2013.01); *B29C 2049/546* (2013.01); *B29C 2049/566* (2013.01); *B29L 2031/7158* (2013.01)

(58) Field of Classification Search
CPC .... B29C 2049/4882; B29C 2049/4892; B29C 49/541; B29C 2049/542; B29C 2049/546
See application file for complete search history.

(56) References Cited

U.S. PATENT DOCUMENTS

| | | | | |
|---|---|---|---|---|
| 4,961,701 | A | * | 10/1990 | Barth .................. B65D 23/001 |
| | | | | 206/519 |
| 5,840,349 | A | | 11/1998 | Brown, Jr. et al. |
| 6,929,462 | B1 | * | 8/2005 | Andrews .............. B29C 33/303 |
| | | | | 425/450.1 |
| 7,153,127 | B2 | | 12/2006 | Struble et al. |
| 7,752,947 | B2 | | 7/2010 | Fiorani et al. |
| 8,205,749 | B2 | | 6/2012 | Korpanty et al. |
| 2004/0156943 | A1 | | 8/2004 | Lefebure |
| 2011/0140314 | A1 | | 6/2011 | Grauer |

FOREIGN PATENT DOCUMENTS

| | | | | |
|---|---|---|---|---|
| FR | | 1503960 | 12/1967 | |
| WO | WO-2011054969 | A2 | * 5/2011 | ............. B29C 49/54 |

\* cited by examiner

BLOW MOLDING MACHINE WITH MOLDS MOVED MECHANICALLY AND WITHOUT THE AID OF ELECTRICAL, HYDRAULIC OR PNEUMATIC DEVICES

RELATED APPLICATIONS

This application is a U.S. national phase application of PCT International Application No. PCT/US2015/057543 filed on Oct. 27, 2015, and claims the benefit of priority to Italian Patent Application Number GE2014A000112, filed on Nov. 4, 2014, the contents of which are incorporated in this application by reference.

TECHNICAL FIELD

The present invention relates generally to a machine for blow molding containers from a tubular parison formed of plastic resin supplied by an extruder and, more particularly, to an extrusion and blow molding machine having molds that are moved mechanically without the aid of electrical, hydraulic, or pneumatic assistance.

BACKGROUND OF THE INVENTION

Containers holding liquids and bulk solids are economically manufactured in a continuous blow molding process wherein a parison comprising a hollow tube of molten polymer resin is extruded continuously from a flow head. A series of moving molds act upon the parison. Each of the moving molds is formed of opposing mold halves which sequentially engage a respective portion of the parison by closing about the parison from opposite sides. As the mold halves comprising a particular mold close about a parison portion, knives on the mold halves sever the parison portion from the continuously extruding parison. The mold then moves away from the flow head to allow the next mold to engage its respective parison portion. After a parison portion is engaged by a mold and cut from the parison, air is injected into the parison portion forcing it to expand and assume the shape of the mold. The mold is then opened (horizontally) to release the newly molded container (ejected downwardly with gravity assist) to a conveyor, which transports the container for further processing. The mold then travels back to the flow head to mold the next container. A detailed description of a process and apparatus for producing the containers is provided in U.S. Pat. No. 5,840,349, incorporated in this document by reference in its entirety.

In a method of molding a hollow plastic container in accordance with U.S. Pat. No. 7,153,127 issued to Struble et al., at least three mold segments are closed around a hollow tube of plastic material having a longitudinal axis by moving at least two of the mold segments toward the third mold segment in directions that are non-parallel to the axis of the tube. The mold segments when closed form a mold cavity that surrounds and captures a portion of the tube. A blow needle or pin on one of the mold segments pierces the tube when the mold segments are closed around the tube and the tube is blown through the blow pin to the internal confines of the mold cavity. The mold cavity is then opened and the blown container is removed from the mold. One of the mold segments preferably comprises a mold core movably mounted on a second of the mold segments, and pneumatic cylinders are mounted on the second mold segment for moving the mold core between an extended position and a retracted position with respect to the second mold segment.

As illustrated by the machine disclosed by Struble et al., blow molding machines often include electrical, hydraulic, or pneumatic devices (typically cylinders) to move the mold segments relative to one another. Such devices are undesirable for a number of reasons. They add to the complexity of the machine, thereby increasing the cost of the machine. Electrical, hydraulic, or pneumatic devices also increase maintenance costs and decrease the rate of producing containers. Often, it is desired to stack the containers. U.S. Pat. No. 8,205,749 issued to Korpanty et al. discloses the advantages of a stackable container assembly that is configured to ensure accurate positioning and registration between respective container assemblies when they are stacked. The stackable container assembly includes a main body; an upstanding rim portion having an upper surface; and a flexible bottom portion. The flexible bottom portion has a lower surface comprising at least one support surface for supporting the container assembly on a horizontal surface. The lower surface further comprises at least one projection (surrounded by a recess) that is disposed radially inwardly from the support surface, and wherein the flexible bottom portion is configured so that the projection will flex downwardly into a position that is adjacent to an upstanding rim portion of an underlying container assembly when the container assembly is stacked on top of another container assembly.

Korpanty et al. address the need for an improved plastic container that is configured so as to ensure accurate registration during stacking. Others have addressed that same need using a variety of bottom container configurations. As discussed below, however, such bottom container configurations create challenges during the molding process, including, for example, the need to avoid damage to projections, corners, and other features of the container bottom as the mold halves open.

Figures 1, 2, 3, 4:
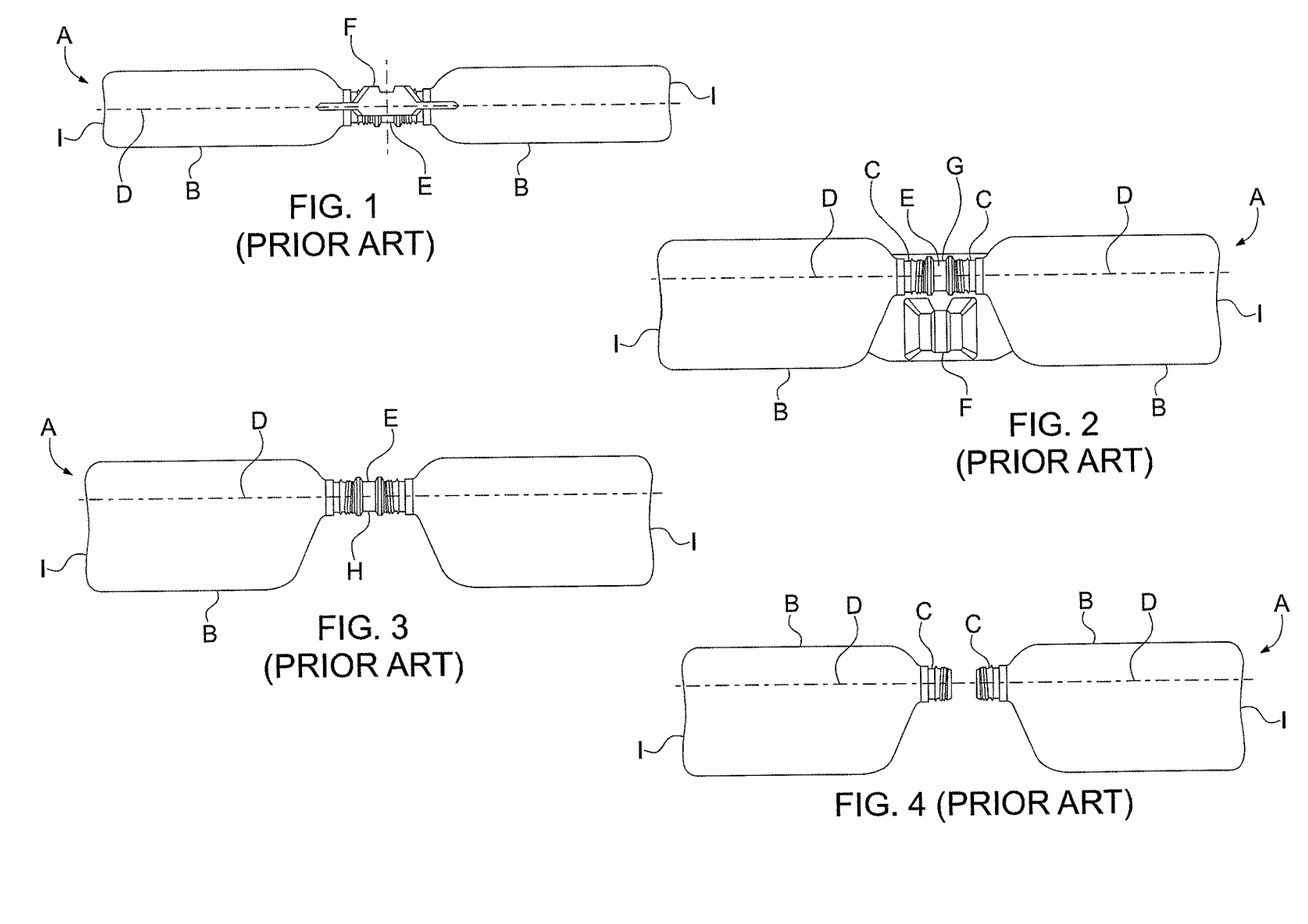
FIG. 1 is a side view of a blow molded, two-bottle log trimmed by a known bottle trimmer.
FIG. 2 is a top view of the two-bottle log illustrated in FIG. 1.
FIG. 3 is a top view of the two-bottle log illustrated in FIGS. 1 and 2 after removing neck flash.
FIG. 4 is a top view of the two-bottle log illustrated in FIG. 3 after trimming of the neck ring to form two trimmed bottles or containers.

Often, as described above, the typical blow molding machine used to form containers has molds configured to form a single bottle at a time. In another exemplary extrusion blow molding operation, pairs of plastic bottles (i.e., containers) are manufactured simultaneously by blow-molding a two-bottle log. Each bottle container portion is formed on an end of the log. The bottles are formed neck-to-neck, with the bottle necks facing each other and joined by a neck ring. The neck ring must be trimmed away to separate the bottles. U.S. Pat. No. 7,752,947 issued to Fiorani et al. discloses a bottle trimmer and method of cutting or trimming a plastic log ejected from a blow mold to form multiple open-mouthed bottles. FIGS. 1 and 2 show a two-bottle log A as ejected from a blow molding machine. The log A includes two blow molded bottles B having necks C located on an axis D offset to one side of the sides of the bottles. Neck ring E extends between the two necks C. Neck flash F extends in the recess between the bottles to one side of the necks and ring.

FIG. 3 illustrates log A with neck flash F and G trimmed away. FIG. 4 illustrates the log with neck ring E trimmed away to separate bottles B and complete the trimming operation. The trimmer and method are especially suitable for high-output production lines. Each of the bottles B has a bottom I which is curved, or has an undercut, so that the bottom I is not flat. This configuration of the bottom I creates a lip or corner around the edge of the bottom I. The curved bottom I is often required for a container adapted to be used with products that create relative pressure changes between the interior of the container and ambient conditions. One example of such a product is yogurt, in which fermentation produces carbon dioxide by yeast activity and increases pressure inside the yogurt container. More generally, fermentation in food processing is the conversion of carbohydrates to alcohols and carbon dioxide or organic acids using yeasts, bacteria, or a combination of the two under anaerobic conditions.

The containers must be designed so that they can be removed from the mold after blowing. This requires that any undercuts must be shallow enough to permit the container to be stripped from the mold when the mold is opened. This limits, in turn, the push-up height that can be achieved, and requires that the cross section of the container have a positive draft toward the mold parting line.

A need exists for an improved plastic container assembly that is configured so as to ensure accurate registration during stacking and so as to minimize unwanted container distortion that might otherwise occur as a result of relative pressure changes between the interior of the container and ambient conditions. Provision of a mold having mold segments that are mounted on, and mechanically movable relative to, another mold segment allows molding of plastic containers having contours, features, and geometries that have not been blow-moldable to date, including containers having deep undercuts, containers having elaborate cross sections, and containers with recesses that facilitate stacking and storing. Therefore, a general object of the present invention is to provide a method and apparatus for molding hollow plastic containers having improved versatility in terms of the geometries, features, and contours of the containers that can be molded.

Although known continuous blow molding machines allow for high production rates of uniform containers, there are disadvantages in the various machines which, if eliminated, would result in more reliable production of high quality containers. One such problem involves the mechanics of opening and closing the mold, which affects the quality of the molded container. It is important that the molds close in precise alignment consistently and maintain the precise alignment throughout the molding process. The molds must withstand significant internal pressure without shifting or parting to ensure a quality container with the requisite uniformity of production.

To overcome the shortcomings of conventional apparatus, an extrusion blow molding machine having molds that are moved mechanically without the aid of electrical, hydraulic, or pneumatic assistance is provided. Thus, an object of the present invention is to avoid electrical, hydraulic, or pneumatic devices. A related object is to provide an improved blow molding machine of reduced complexity, weight, and cost. Another related object is to minimize the costs required to maintain the machine.

BRIEF SUMMARY OF THE INVENTION

To achieve these and other objects, to meet these and other needs, and in view of its purposes, the present invention provides an extrusion blow mold machine forming hollow containers from a tube or parison of resin material. The blow mold machine has at least one pair of opposing half molds that combine to form a mold and define a mold cavity. Each of the half molds is positioned on a respective carrier plate and includes a first mold segment, a second mold segment, and a third mold segment mounted adjacent to the path of the tube or parison of resin material that will form the container. The first and third mold segments can move with respect to each other and with respect to both the second mold segment and the axis of the tube between an open position that permits passage of the tube between the mold segments, and a closed position in which the mold segments cooperate to form a closed mold cavity for blow-molding the container. A mechanical structure creates vertical movement of the first and third mold segments relative to the second mold segment as the mold opens horizontally, without the aid of any electrical, hydraulic, or pneumatic device. A closing unit engages at least one of the carrier plates to move the at least one carrier plate and its respective half mold toward and away from the opposing half mold and its respective carrier plate, thereby closing and opening the mold.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 5:
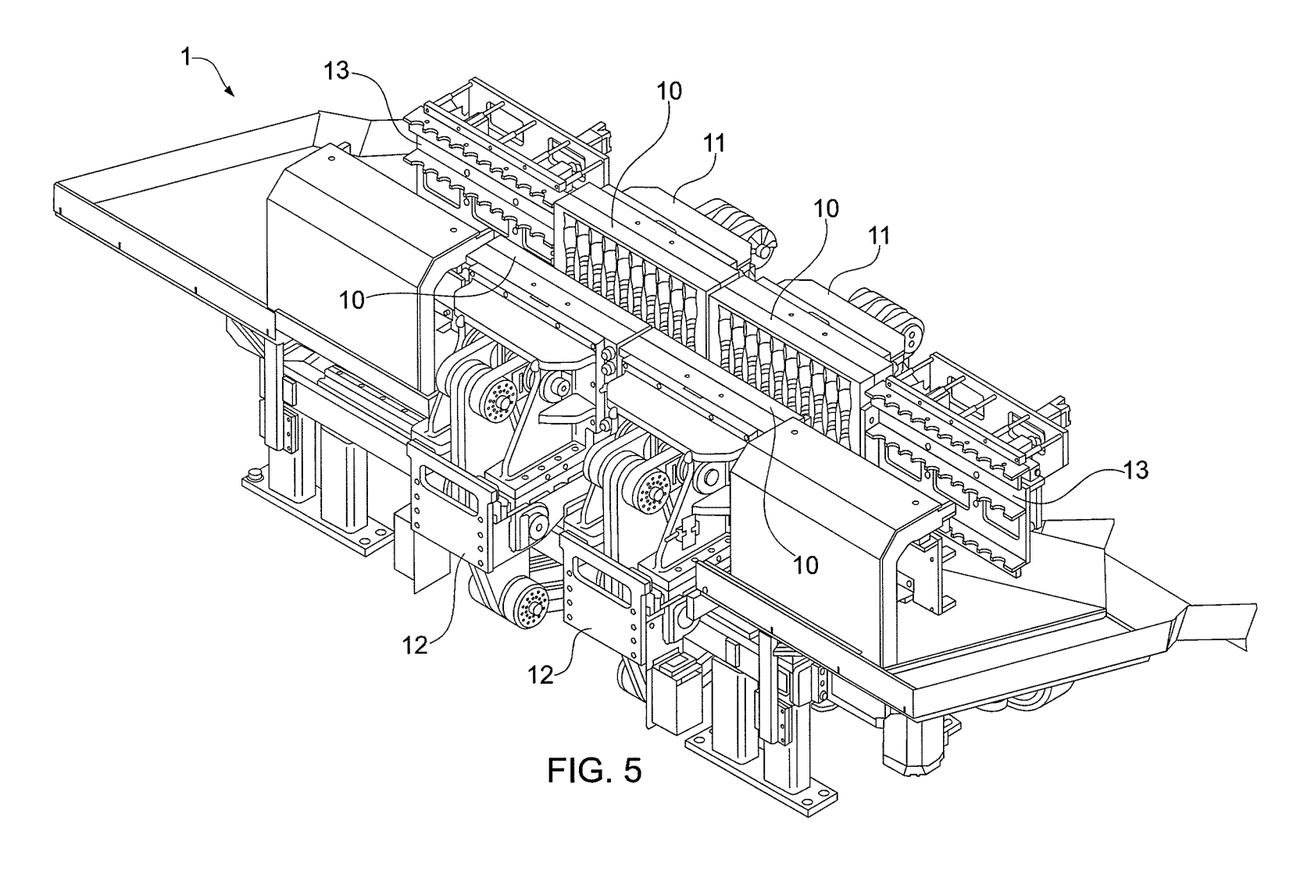
FIG. 5 illustrates one embodiment of an extrusion blow mold machine in accordance with the present invention.

Referring now to the drawing, in which like reference numbers refer to like elements throughout the various figures that comprise the drawing, FIG. 5 illustrates, in a perspective view, one embodiment of an extrusion blow mold machine 1 in accordance with the present invention. The blow mold machine 1 has a plurality of opposing half molds 10 that form the hollow containers 80 produced by the blow mold machine 1. Four half molds 10, which combine to form two separate molds, are illustrated in FIG. 5. Any even number of half molds 10 can be included in the blow mold machine 1, however, as would be known to an artisan.

The half molds 10 are integral with respective carrier plates 11. By "integral" is meant a single piece or a single unitary part that is complete by itself without additional pieces, i.e., the part is of one monolithic piece formed as a unit with another part. The carrier plates 11 and, therefore, the half molds 10 are opened and closed (i.e., the half molds 10 are moved away from or towards each other) by respective clamping or closing units 12. The closing units 12 are normally used in automatic blow mold machines such as blow mold machine 1. Also shown in FIG. 5 are stations 13 which eliminate scraps of the product.

Figure 6:
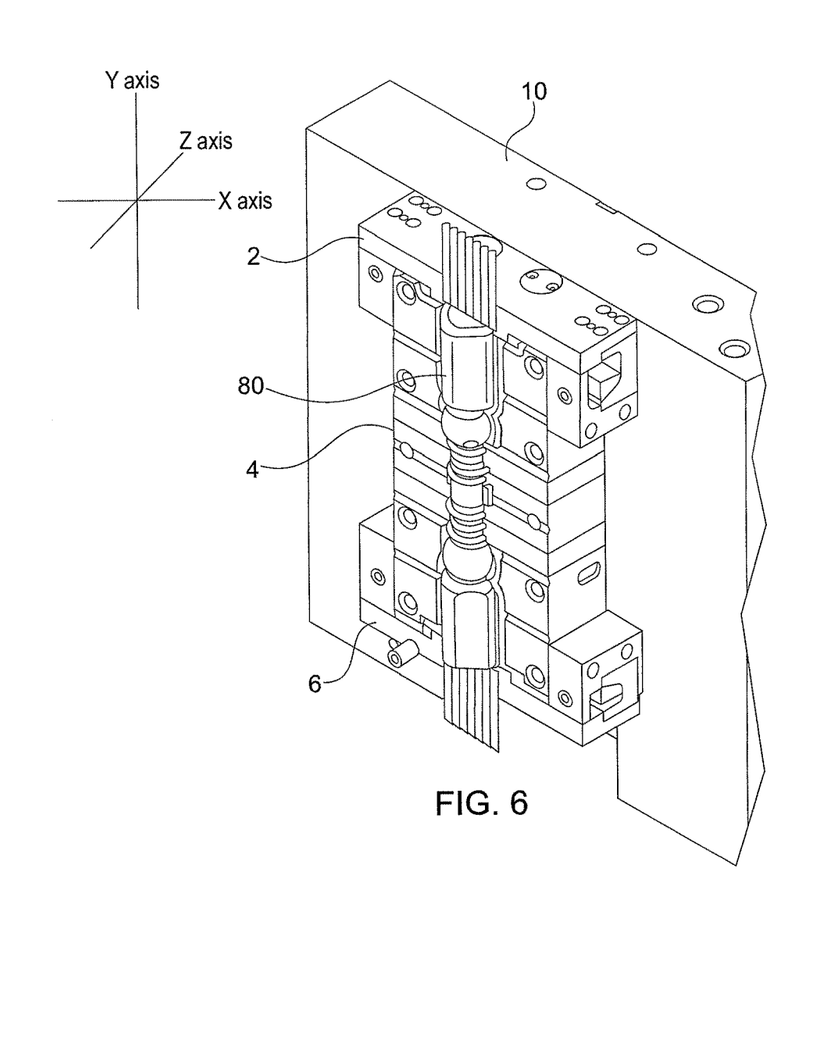
FIG. 6 illustrates one half mold that, with a corresponding and opposing half mold, forms the mold of the extrusion blow mold machine shown in FIG. 5.

Each mold is composed of two half molds 10 and, as illustrated in FIG. 6, each half mold 10 is divided into three, separate, mold segments 2, 4, and 6. For reference, also shown in FIG. 6 is the conventional Cartesian coordinate system. As is well known, one can specify the position of any point in three-dimensional space by three Cartesian coordinates x, y, and z, and its signed distances to three mutually perpendicular planes (or, equivalently, by its perpendicular projection onto three mutually perpendicular lines or axes). The first mold segment 2 and the third mold segment 6 are each movable in the vertical direction along the "y" axis (i.e., along the ordinate in the Cartesian coordinate system shown in FIG. 6) with respect to the second mold segment 4. The second mold segment 4 is fixed to and integral with the carrier plates 11 that generate the closure of the two half molds 10. The half molds 10 open and close along the "z" axis of the Cartesian coordinate system shown in FIG. 6.

The first mold segment 2, second mold segment 4, and third mold segment 6 are mounted adjacent to the path of the tube or parison of resin material (not shown) that will form the container 80. The first and third mold segments 2 and 6 are movable with respect to each other and with respect to both the second mold segment 4 and the axis of the tube between an open position illustrated in FIG. 5 that permits passage of the tube between the mold segments, and a closed position in which the mold segments cooperate to form a closed mold cavity for blow-molding the container 80.

Figure 7:
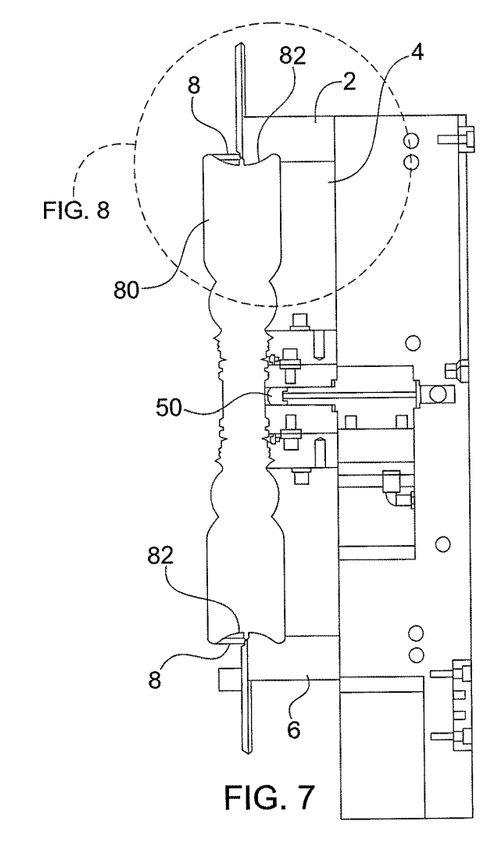
FIG. 7 illustrates the placement of a blow molded container within the cavity of a half mold of the blow mold machine shown in FIG. 5.

As illustrated in FIG. 7, each half mold 10 has a central block or plug 50. The plug 50 may be located, as shown, on the second mold segment 4. The plug 50 is mobile and moves horizontally (along the x-direction) during the opening phase of the mold cavity to facilitate extraction of the container 80 from the mold cavity. The plug 50 is actuated by springs and returns to its original position during the closing phase of the mold.

As also illustrated in FIG. 7, the containers 80 produced by the blow mold machine 1 often have undercuts or recesses 82 generated by the blow molding process. Some of the many reasons for the containers 80 to be designed with the undercuts or recesses 82 are discussed above. One problem with such designs is that it is difficult to extract or remove the containers 80 from the mold cavity without damage. The present invention recognizes and addresses this problem.

Figure 8:
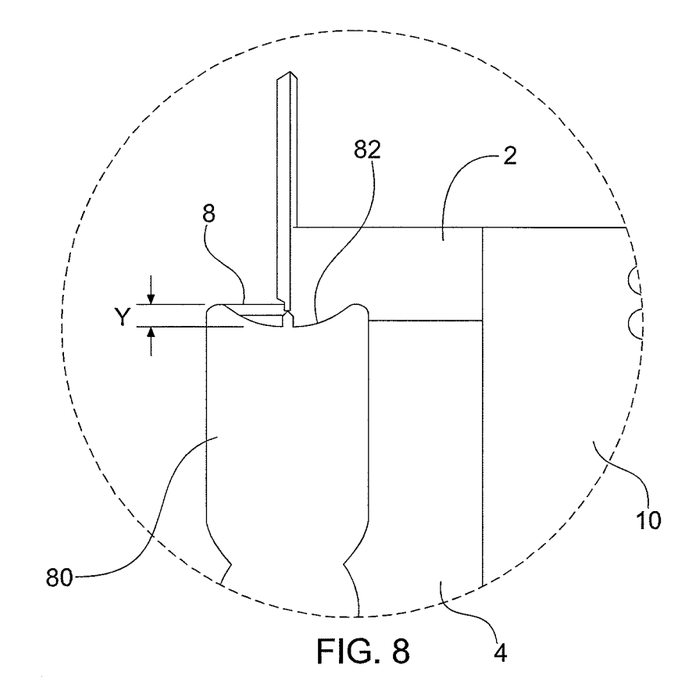
FIG. 8 highlights a problem, namely the extension of a stem of the half mold into the undercut or recess of the container formed in the mold cavity, solved by the blow mold machine in accordance with the present invention.

FIG. 8 highlights the problem. A stem 8 of the first mold segment of the half mold 10 extends into the undercut or recess 82 of the container 80 a dimension or distance "Y" after the container is blow molded. When the mold is opened and the container 80 is to be extracted or removed from the mold cavity created by the mold segments 2, 4, and 6, the outer rim or border of the undercut or recess 82 is blocked by the stem 8. In conventional blow mold machines, the flexibility or pliability of the plastic container 80 may have allowed the undercut or recess 82 to force its way or push past the metal (often steel) stem 8 if the dimension or distance Y of the undercut or recess 82 were sufficiently small. The extraction or removal process risked damage, however, to the container 80. Moreover, extraction or removal of the container 80 could not be achieved at all when the dimension or distance Y was sufficiently large to preclude the outer rim or border of the undercut or recess 82 from pushing past the stem 8. In that case, the problem precluded production of certain containers 80 on the conventional machine.

For purposes of example only, containers 80 designed with a dimension or distance Y of about 4-5 mm could be extracted or removed from most conventional blow mold machines. When the dimension or distance Y is greater, on the order of 7-8 mm, the container 80 cannot be extracted or removed either without damage or at all. The problem exists for blow mold machines that produce one container 80 per mold cavity.

The problem is exacerbated, however, on blow mold machines that produce two containers or bottles in one mold cavity in a neck-to-neck configuration. For machines that manufacture pairs of plastic bottles (i.e., containers) simultaneously, each container or bottle has its own undercut or recess 82 that must force its way or push past a respective stem 8 (as shown in FIG. 7). Thus, although containers 80 of certain designs might be made on conventional single-container mold machines, those containers cannot be made on the higher production rate neck-to-neck machines.

Figure 9:
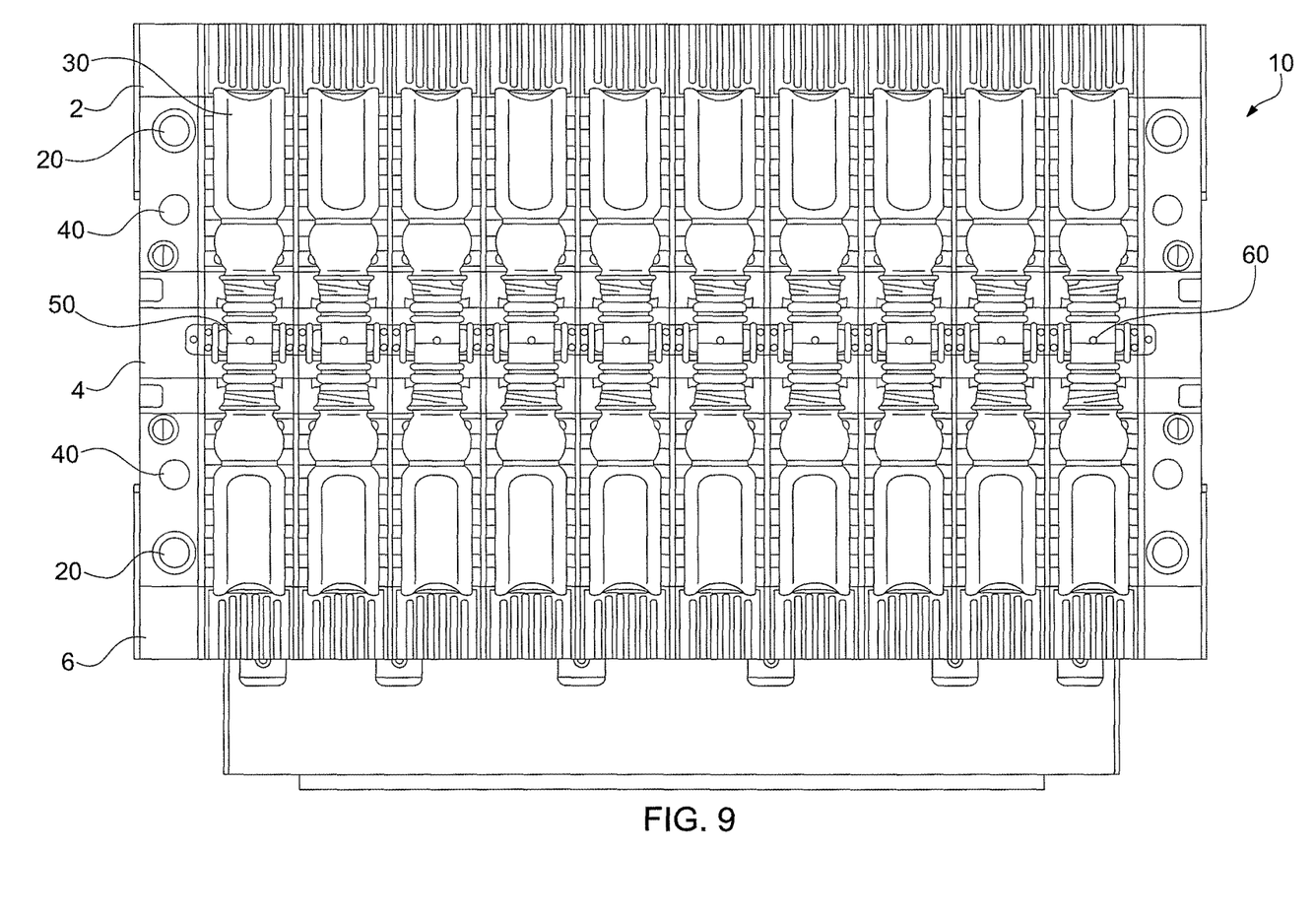
FIG. 9 is a front view of the half mold of the blow mold machine shown in FIG. 5.

The improved blow mold machine 1 according to the present invention solves the problem identified. The blow mold machine 1 incorporates a mechanical structure into the molds of the extrusion blow mold machine 1 for the production of hollow containers 80. This structure enables the production of containers 80 having undercuts or recesses 82 that would prevent the extraction or removal of the container 80 from conventional machines. In addition to allowing containers 80 of a wide variety of designs to be manufactured both at all and in a high-production rate neck-to-neck configuration, the mechanical actuation structure functions without the use of pneumatic, hydraulic, or electrical actuators. The mechanical structure is an integral part of the half mold 10, and is described in detail below. FIG. 9 is a front view of the half mold 10 of the blow mold machine 1. Illustrated are the first, second, and third mold segments 2, 4, and 6 of the half mold 10. Also illustrated are the central plugs 50, which facilitate extraction of the containers 80 from the mold cavities, and the needles 60, through which air is blown into the parisons to form the containers 80. Finally, a plurality of pins 20 and safety rods 40 are illustrated.

Figure 10:
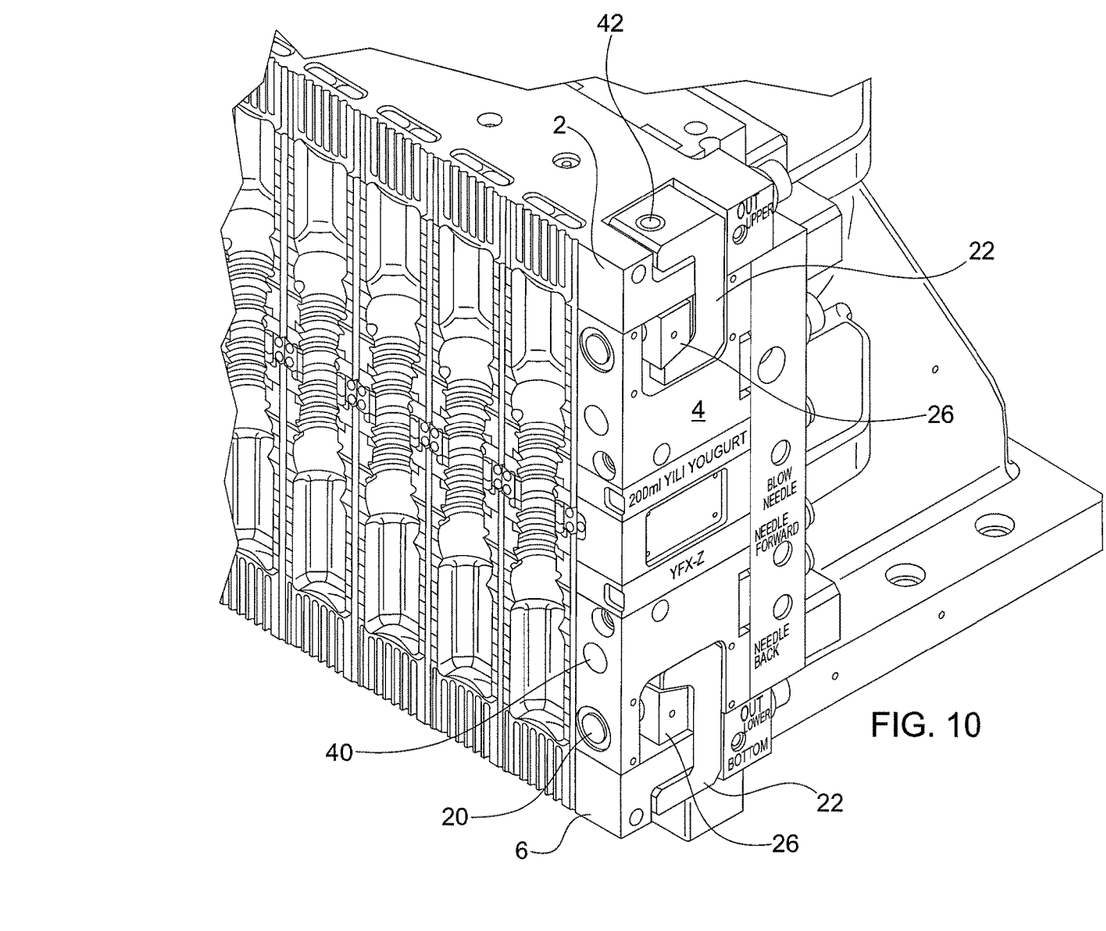
FIG. 10 is a perspective view of the half mold of the blow mold machine shown in FIG. 5.

FIG. 10 is a perspective view of the half mold 10 of the blow mold machine 1. The movement of the moveable mold segments 2 and 6 is driven by the pins 20 which are pushed inside the half mold 10 during the closing phase of the mold. Each of the pins 20 engage a respective wedge 26. In turn, the wedges 26 engage respective hooks 22 carried by each of the first and third mold segments 2 and 6. Angled surfaces of the wedges 26 engage correspondingly angled surfaces of the hooks 22 so that, by translating along the horizontal axis, the wedges 26 determine the vertical displacement of the hooks 22. The amount of vertical displacement that occurs for a specific amount of horizontal translation of the pins 20 is predetermined by the angle of the correspondingly angled surfaces of the hooks 22 and wedges 26. By "predetermined" is meant determined beforehand, so that the predetermined characteristic is determined, i.e., chosen or at least known, before the blow mold machine 1 is operated. A suitable angle for the correspondingly angled surfaces is between about 30 and 60 degrees and, for example, may be about 45 degrees.

Thus, horizontal movement of the pins 20 creates vertical movement of the first and third mold segments 2 and 6 as the molds open. This vertical movement allows each of the first and third mold segments 2 and 6, and specifically the stems 8, to move out of any undercuts or recesses 82 on the containers 80 that would have otherwise prevented the extraction or removal of the containers 80 from conventional machines. In other words, the undercuts or recesses 82 do not block or prevent opening of the molds of the blow mold machine 1.

FIG. 10 also depicts screw-threaded adjustments 42. A screw-threaded adjustment 42 is provided on each of the first mold segment 2 and the third mold segment 6. The function of the screw-threaded adjustment 42 is to ensure the correct vertical positioning of the first mold segment 2 and the third mold segment 6 with respect to the second mold segment 4. This allows the user to adjust the contact force between the second mold segment 4 and each of the first mold segment 2 and the third mold segment 6.

Figure 11:
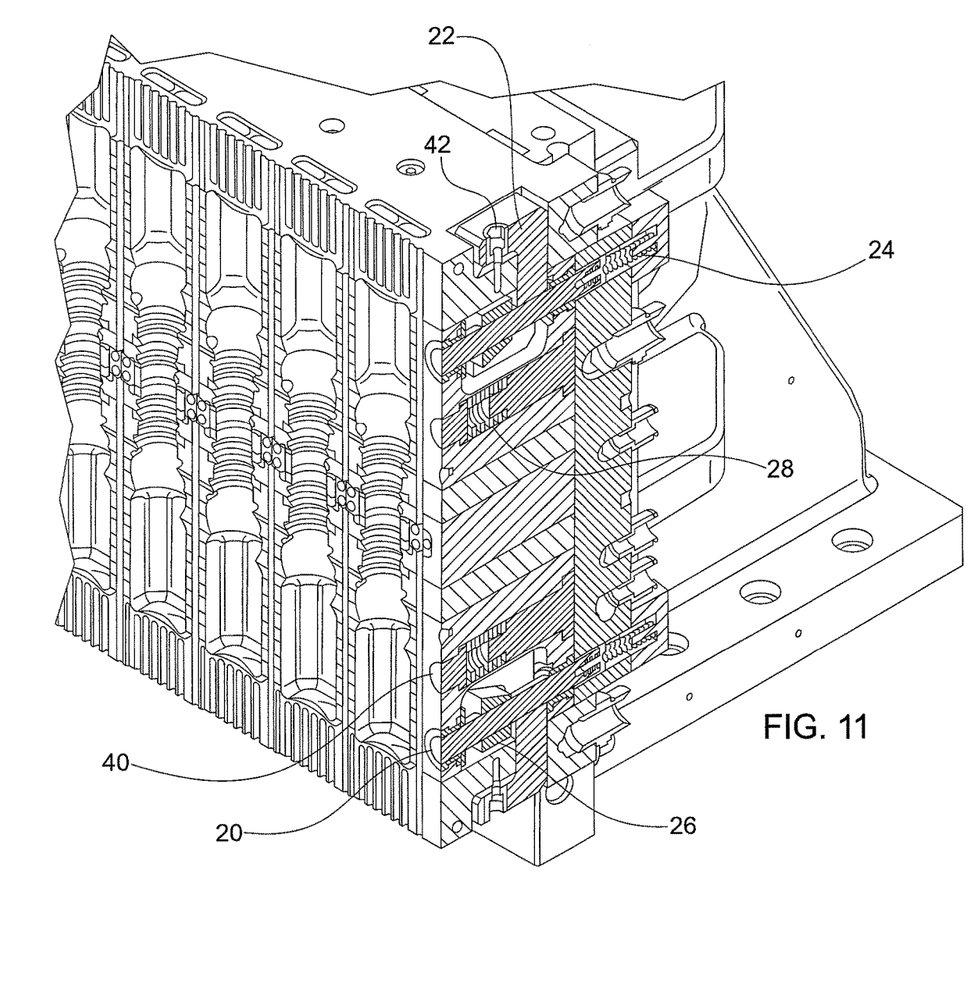
FIG. 11 is a perspective view, in partial cross section, of the half mold shown in FIG. 10.

FIG. 11 is a perspective view, in partial cross section, of the half mold 10 of the blow mold machine 1. Illustrated in FIG. 11 are a number of springs 24. The springs 24 function to facilitate movement or translation of the pins 20 and, therefore, the wedges 26 during the opening phase of the molds.

During the approach of the two half molds 10 in the closing phase of the mold, the pins 20 are counteracted by the safety rods 40 that are present in the opposing half mold 10 in a coaxial position. Like the pins 20, the safety rods 40 are located in the second mold segment 4. The function of the safety rods 40 and their corresponding springs 28 is to avoid damage to components of the blow mold machine 1 in the event that, during the closing phase, obstacles, debris, or other foreign elements are placed between the various segments of the half mold 10 (i.e., between the first mold segment 2 and the second mold segment 4 or between the second mold segment 4 and the third mold segment 6). A very high force is required to compress the spring 28, greater than the force required during the normal working phase. Therefore, the spring 28 will be compressed only upon the occurrence of an abnormal condition.

Figure 12:
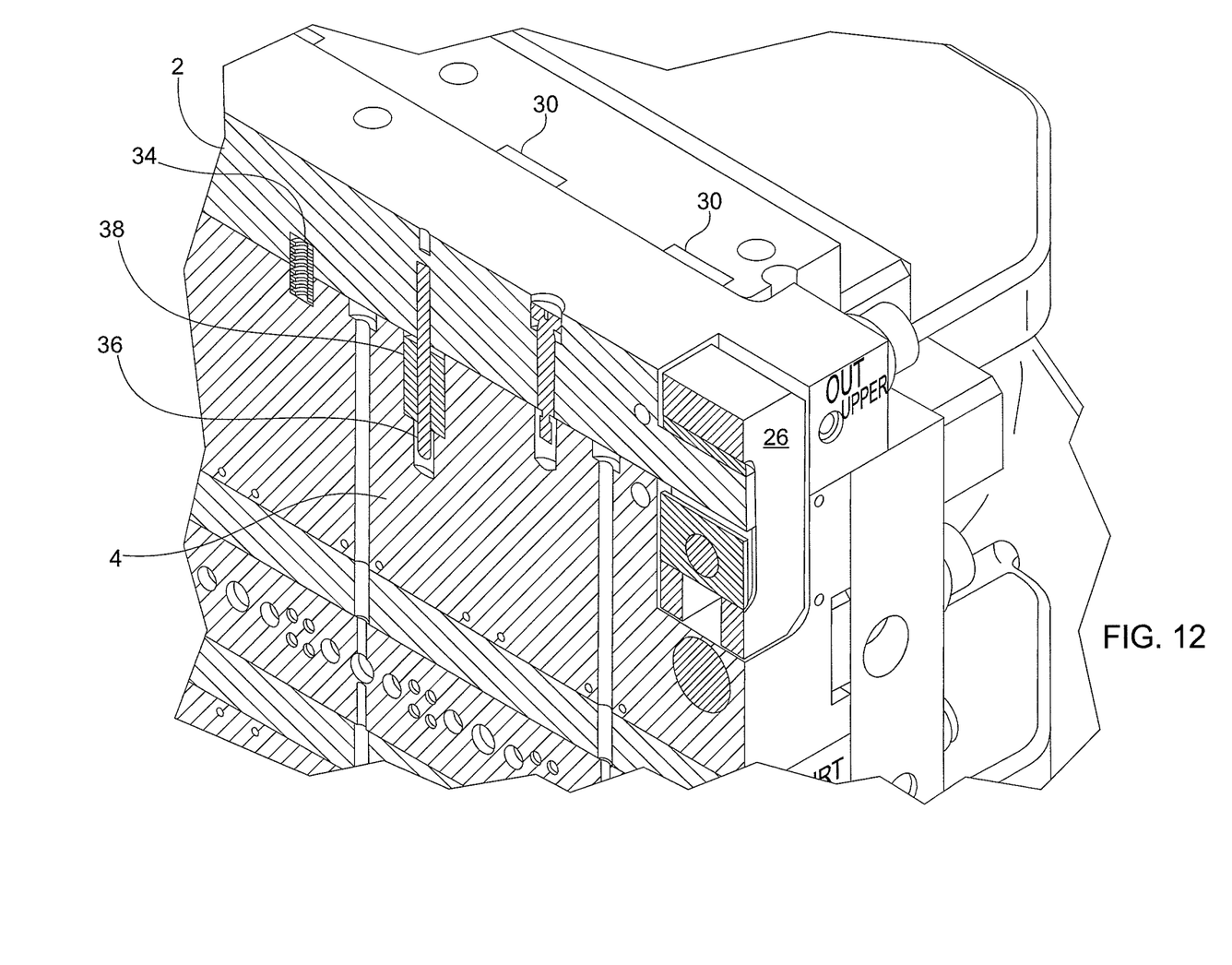
FIG. 12 is a perspective view of the half mold of the blow mold machine shown in FIG. 5, highlighting the alignment features between the various mold segments of the half mold.

FIG. 12 is a perspective view of the half mold 10 of the blow mold machine 1 highlighting the alignment features between the second mold segment 4 and the first mold segment 2 (and, although not shown, the third mold segment 6). During the opening phase, the first mold segment 2 and the third mold segment 6 of the half mold 10 move away from the stationary second mold segment 4 of the half mold 10 under the force exerted by springs 34. The first mold segment 2 and the third mold segment 6 are guided in their movement by several vertical guide columns 36 on sliding bushings 38. Also shown in FIG. 12 are a plurality of air exhausts 30.

One advantage of the blow mold machine 1 of the present invention is that the containers 80 made using the blow mold machine 1 need not be designed specifically so that they can be removed from the mold after blowing. Thus, for example, any undercuts or recesses 82 on the bottom of the containers 80 may be designed without limitations imposed by the need to remove the containers 80 from the mold. The undercuts or recesses 82 may be made as deep as desired by the designer.

By providing moveable mold segments 2 and 6 that are mounted on, and mechanically movable relative to, the stationary mold segment 4, the blow mold machine 1 can mold plastic containers 80 having contours, features, and geometries that cannot be blow molded by conventional blow mold machines. Such containers 80 include containers having deep undercuts or recesses 82, containers having elaborate cross sections, and containers with undercuts and recesses 82 that facilitate stacking and storing.

The mold segments 2, 4, and 6 of the blow mold machine 1 of the present invention move mechanically without the aid of electrical, hydraulic, or pneumatic assistance. Thus, electrical, hydraulic, or pneumatic devices are avoided, thereby reducing the complexity, weight, and cost of the blow mold machine 1 relative to conventional blow mold machines. The costs required to maintain the blow mold machine 1 are also reduced relative to conventional machines.

The absence of electrical, hydraulic, or pneumatic devices also contributes to a clean production environment, a reduction of overall noise, and lower cooling needs for the blow mold machine 1. Such absence also eliminates the problem of draining and disposing of used oil, and reduces the ecologic impact of the blow mold machine 1 on the environment. Further, the absence of electrical, hydraulic, or pneumatic devices increases the safety for operators, as there is no risk of any latent pressure in the blow mold machine 1. The blow mold machine 1 is also easy to transport, install, and redeploy, and it fits into limited spaces.

The blow mold machine 1 of the present invention forms containers 80 via an extrusion blow molding process. The blow molding process is described above. Distinguish a separate and distinct manufacturing process called injection molding. Injection molding is a manufacturing process for producing parts by injecting material into a mold. Injection molding can be performed with a host of materials, including metals, glasses, elastomers, confections, and most commonly thermoplastic and thermosetting polymers. Material for the part is fed into a heated barrel, mixed, and forced into a mold cavity where it cools and hardens to the configuration of the cavity. After a product is designed, usually by an industrial designer or an engineer, molds are made by a toolmaker from metal, usually either steel or aluminum, and precision-machined to form the features of the desired part. Injection molding is widely used to manufacture a variety of parts. The parts to be injection molded must be very carefully designed, however, to facilitate the molding process: the material used for the part, the desired shape and features of the part, the material of the mold, and the properties of the molding machine must all be taken into account.

Blow molding differs from injection molding in several key ways, three of which are summarized as follows. First, injection molding makes solid parts, like a Frisbee®, while blow molding makes hollow parts, like the container 80. Second, blow molding, by its nature, makes parts whose wall thickness will vary from place to place, based on how much the material has to stretch as it is being blown. The thickness of an injection-molded part is determined by the mold and core relationship. Third, with injection molding, once the mold is made the process is largely complete. In blow molding, making the mold is only part of the process. A host of other variables must be managed closely, such as the type of plastic, the process temperature, the velocity or pressure of the blown air, and the mold close speed. In conclusion, machine designs that might be suitable for injection molding are not necessarily suitable for blow molding applications.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. An extrusion blow mold machine forming hollow containers from a tube or parison of resin material, the blow mold machine comprising:
   at least one pair of opposing half molds that combine to form a mold and define a mold cavity, each of the half molds positioned on a respective carrier plate and including a first mold segment, a second mold segment, and a third mold segment mounted adjacent to the path of the tube or parison of resin material that will form the container, the first and third mold segments movable with respect to each other and with respect to both the second mold segment and the axis of the tube between an open position that permits passage of the tube between the mold segments, and a closed position in which the mold segments cooperate to form a closed mold cavity for blow molding the container;
   a mechanical structure creating vertical movement of the first and third mold segments relative to the second mold segment as the mold opens horizontally, without the aid of any electrical, hydraulic, or pneumatic device;
   a closing unit that engages at least one of the carrier plates to move the at least one carrier plate and its respective half mold toward and away from the opposing half mold and its respective carrier plate, thereby closing and opening the mold; and
   a central plug (a) located on the second mold segment and b) moving horizontally during the opening phase of the mold to facilitate extraction of the container from the mold cavity and (c) returning to its original position during the closing phase of the mold.

2. The extrusion blow mold machine according to claim 1, wherein the first mold segment and the third mold segment are each movable in the vertical direction with respect to the second mold segment and the second mold segment is fixed to and integral with the carrier plate that generates the closure of the two half molds.

3. The extrusion blow mold machine according to claim 1, wherein the container has an undercut or recess on its bottom surface, and at least one of the first mold segment and the third mold segment has a stem that extends into the undercut or recess after the container is blow molded.

4. The extrusion blow mold machine according to claim 1, wherein the machine produces one container per mold cavity.

5. The extrusion blow mold machine according to claim 1, wherein the machine produces multiple containers per mold cavity in a neck-to-neck configuration.

6. An extrusion blow mold machine forming hollow containers from a tube or parison of resin material, the blow mold machine comprising:
   at least one pair of opposing half molds that combine to form a mold and define a mold cavity, each of the half molds positioned on a respective carrier plate and including a first mold segment, a second mold segment, and a third mold segment mounted adjacent to the path of the tube or parison of resin material that will form the container, the first and third mold segments movable with respect to each other and with respect to both the second mold segment and the axis of the tube between an open position that permits passage of the tube between the mold segments, and a closed position in which the mold segments cooperate to form a closed mold cavity for blow molding the container;
   a mechanical structure creating vertical movement of the first and third mold segments relative to the second mold segment as the mold opens horizontally, without the aid of any electrical, hydraulic, or pneumatic device, the mechanical structure including:
   (a) pins located in the second mold segment which drive movement of the first and third moveable mold segments and which are pushed horizontally inside the half mold during the closing phase of the mold;
   (b) wedges located in the second mold segment, engaged and moved by the pins, and having an angled surface; and
   (c) hooks carried by each of the first and third mold segments, each hook having an angled surface corresponding to the angled surface of the wedges,
   wherein the angled surfaces of the wedges engage the correspondingly angled surfaces of the hooks so that, by translating along the horizontal axis, the wedges determine the vertical displacement of the hooks and therefore of the first and third mold segments; and
   a closing unit that engages at least one of the carrier plates to move the at least one carrier plate and its respective half mold toward and away from the opposing half mold and its respective carrier plate, thereby closing and opening the mold.

7. The extrusion blow mold machine according to claim 6, wherein the amount of vertical displacement of the first and third mold segments that occurs for a specific amount of horizontal translation of the pins is predetermined by the angle of the correspondingly angled surfaces of the hooks and wedges.

8. The extrusion blow mold machine according to claim 7, wherein the angle for the correspondingly angled surfaces of the wedges and hooks is between about 30 and 60 degrees.

9. The extrusion blow mold machine according to claim 8, wherein the angle for the correspondingly angled surfaces of the wedges and hooks is about 45 degrees.

10. The extrusion blow mold machine according to claim 6, wherein the container has an undercut or recess on its bottom surface, at least one of the first mold segment and the third mold segment has a stem that extends into the undercut or recess after the container is blow molded, and the angled surfaces of the wedges and the correspondingly angled surfaces of the hooks are predetermined so that the vertical displacement of the first and third mold segments as the mold opens suffices to move the stems out of the undercut or recess on the container.

11. The extrusion blow mold machine according to claim 6, further comprising at least one spring that facilitates movement of the pins and, therefore, the wedges during the opening phase of the mold.

12. The extrusion blow mold machine according to claim 6, further comprising safety rods being located in the second mold segment coaxially with respect to the pins and having corresponding springs, wherein during the approach of the two half molds in the closing phase of the mold the pins are counteracted by the safety rods and their corresponding springs to void damage to components of the blow mold machine in the event that, during the closing phase, obstacles, debris, or other foreign elements are placed between the first mold segment and the second old segment or between the second mold segment and the third mold segment.

13. An extrusion blow mold machine forming hollow containers from a tube or parison of resin material, the blow mold machine comprising:
　　at least one pair of opposing half molds that combine to form a mold and define a mold cavity, each of the half molds positioned on a respective carrier plate and including a first mold segment, a second mold segment, and a third mold segment mounted adjacent to the path of the tube or parison of resin material that will form the container, the first and third mold segments movable with respect to each other and with respect to both the second mold segment and the axis of the tube between an open position that permits passage of the tube between the mold segments, and a closed position in which the mold segments cooperate to form a closed mold cavity for blow molding the container;
　　a mechanical structure creating vertical movement of the first and third mold segments relative to the second mold segment as the mold opens horizontally, without the aid of any electrical, hydraulic or pneumatic device;
　　a closing unit that engages at least one of the carrier plates to move the at least one carrier plate and its respective half mold toward and away from the opposing half mold and its respective carrier plate, thereby closing and opening the mold; and
　　a screw-threaded adjustment provided on each of the first mold segment and the third mold segment, the screw-threaded adjustment ensuring the correct vertical positioning of the first mold segment and the third mold segment with respect to the second mold segment and allowing adjustment of the contact force between the second mold segment and each of the first mold segment and the third mold segment.

14. An extrusion blow mold machine forming hollow containers from a tube or parison of resin material, the blow mold machine comprising:
　　at least one pair of opposing half molds that combine to form a mold and define a mold cavity, each of the half molds positioned on a respective carrier plate and including a first mold segment, a second mold segment, and a third mold segment mounted adjacent to the path of the tube or parison of resin material that will form the container, the first and third mold segments movable with respect to each other and with respect to both the second mold segment and the axis of the tube between an open position that permits passage of the tube between the mold segments, and a closed position in which the mold segments cooperate to form a closed mold cavity for blow molding the container;
　　a mechanical structure creating vertical movement of the first and third mold segments relative to the second mold segment as the mold opens horizontally, without the aid of any electrical, hydraulic, or pneumatic device;
　　a closing unit that engages at least one of the carrier plates to move the at least one carrier plate and its respective half mold toward and away from the opposing half mold and its respective carrier plate, thereby closing and opening the mold; and
　　alignment features between the second mold segment and the first and third mold segments.

15. An extrusion blow mold machine forming hollow containers from a tube or parison of resin material, the blow mold machine comprising:
　　at least one pair of opposing half molds that combine to form a mold and define a mold cavity, each of the half molds positioned on a respective carrier plate and including a first mold segment, a second mold segment fixed to and integral with the carrier plate, and a third mold segment mounted adjacent to the path of the tube or parison of resin material that will form the container, the first and third mold segments movable in the vertical direction with respect to each other and with respect to both the second mold segment and the axis of the tube between an open position that permits passage of the tube between the mold segments, and a closed position in which the mold segments cooperate to form a closed mold cavity for blow molding the container;
　　a mechanical structure including:
　　　　(a) pins located in the second mold segment which drive movement of the first and third moveable mold segments and which are pushed horizontally inside the half mold during the closing phase of the mold,
　　　　(b) wedges located in the second mold segment, engaged and moved by the pins, and having an angled surface, and
　　　　(c) hooks carried by each of the first and third mold segments, each hook having an angled surface corresponding to the angled surface of the wedges,
　　wherein the angled surfaces of the wedges engage the correspondingly angled surfaces of the hooks so that, by translating along the horizontal axis, the wedges determine the vertical displacement of the hooks and therefore of the first and third mold segments, and wherein the amount of vertical displacement of the first and third mold segments that occurs for a specific amount of horizontal translation of the pins is predetermined by the angle of the correspondingly angled surfaces of the hooks and wedges; and
　　a closing unit that engages at least one of the carrier plates to move the at least one carrier plate and its respective half mold toward and away from the opposing half mold and its respective carrier plate, thereby closing and opening the mold.

16. The extrusion blow mold machine according to claim 15, wherein the machine produces one container per mold cavity.

17. The extrusion blow mold machine according to claim 15, wherein the machine produces multiple containers per mold cavity in a neck-to-neck configuration.

18. The extrusion blow mold machine according to claim 15, wherein the angle for the correspondingly angled surfaces of the wedges and hooks is between about 30 and 60 degrees.

19. The extrusion blow mold machine according to claim 15, wherein the container has an undercut or recess on its bottom surface, at least one of the first mold segment and the third mold segment has a stem that extends into the undercut or recess after the container is blow molded, and the angled surfaces of the wedges and the correspondingly angled surfaces of the hooks are predetermined so that the vertical displacement of the first and third mold segments as the mold opens suffices to move the stems out of the undercut or recess on the container.

20. The extrusion blow mold machine according to claim 14, wherein the first mold segment and the third mold segment are each movable in the vertical direction with respect to the second mold segment and the second mold segment is fixed to and integral with the carrier plate that generates the closure of the two half molds.

* * * * *

UNITED STATES PATENT AND TRADEMARK OFFICE
CERTIFICATE OF CORRECTION

| | | |
|---|---|---|
| PATENT NO. | : 10,442,129 B2 | Page 1 of 1 |
| APPLICATION NO. | : 15/523455 | |
| DATED | : October 15, 2019 | |
| INVENTOR(S) | : Gabriele Pinardi and Moreno Minghetti | |

It is certified that error appears in the above-identified patent and that said Letters Patent is hereby corrected as shown below:

In the Claims

At Column 10, Line 65 should read:
springs to avoid damage to components of the blow mold Signed and Sealed this
Seventh Day of January, 2020

Andrei Iancu
*Director of the United States Patent and Trademark Office*